A. FINKELSTEIN.
AUTOMOBILE SLEIGH.
APPLICATION FILED MAR. 27, 1911.
1,008,409.
Patented Nov. 14, 1911.
4 SHEETS—SHEET 4.
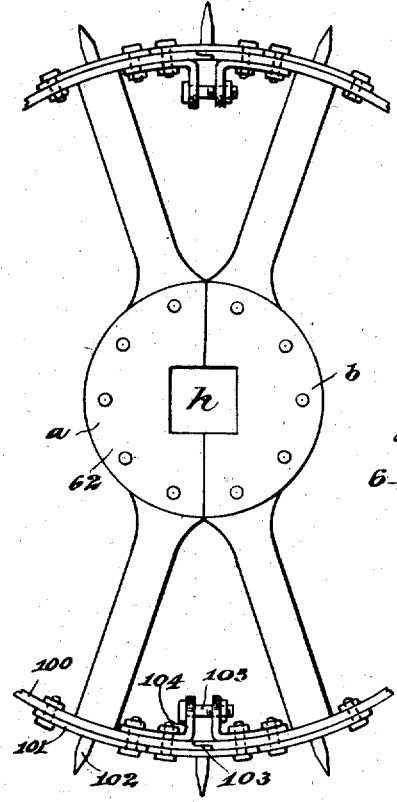
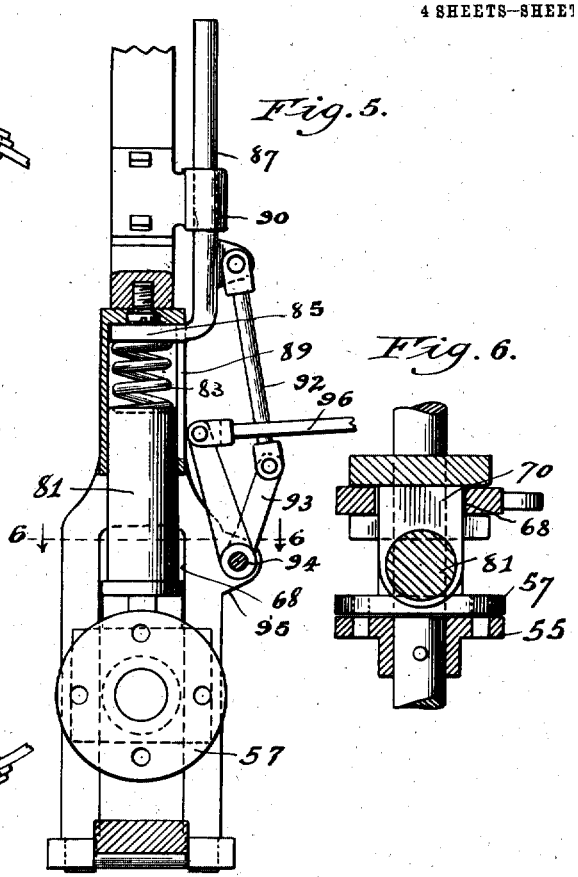
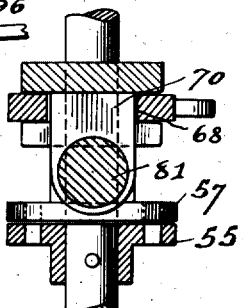
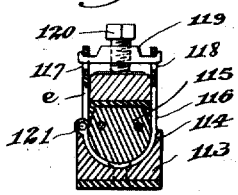

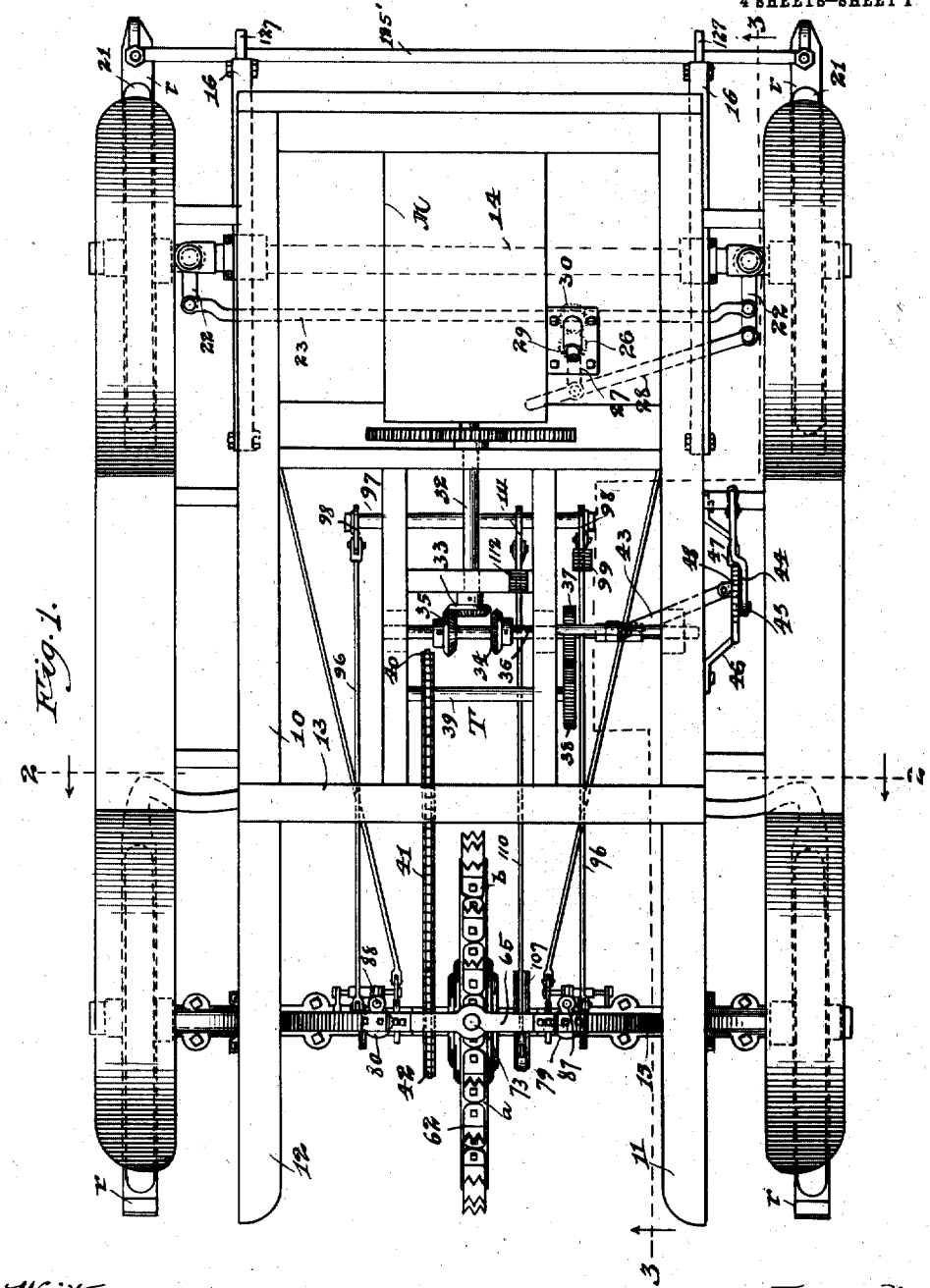

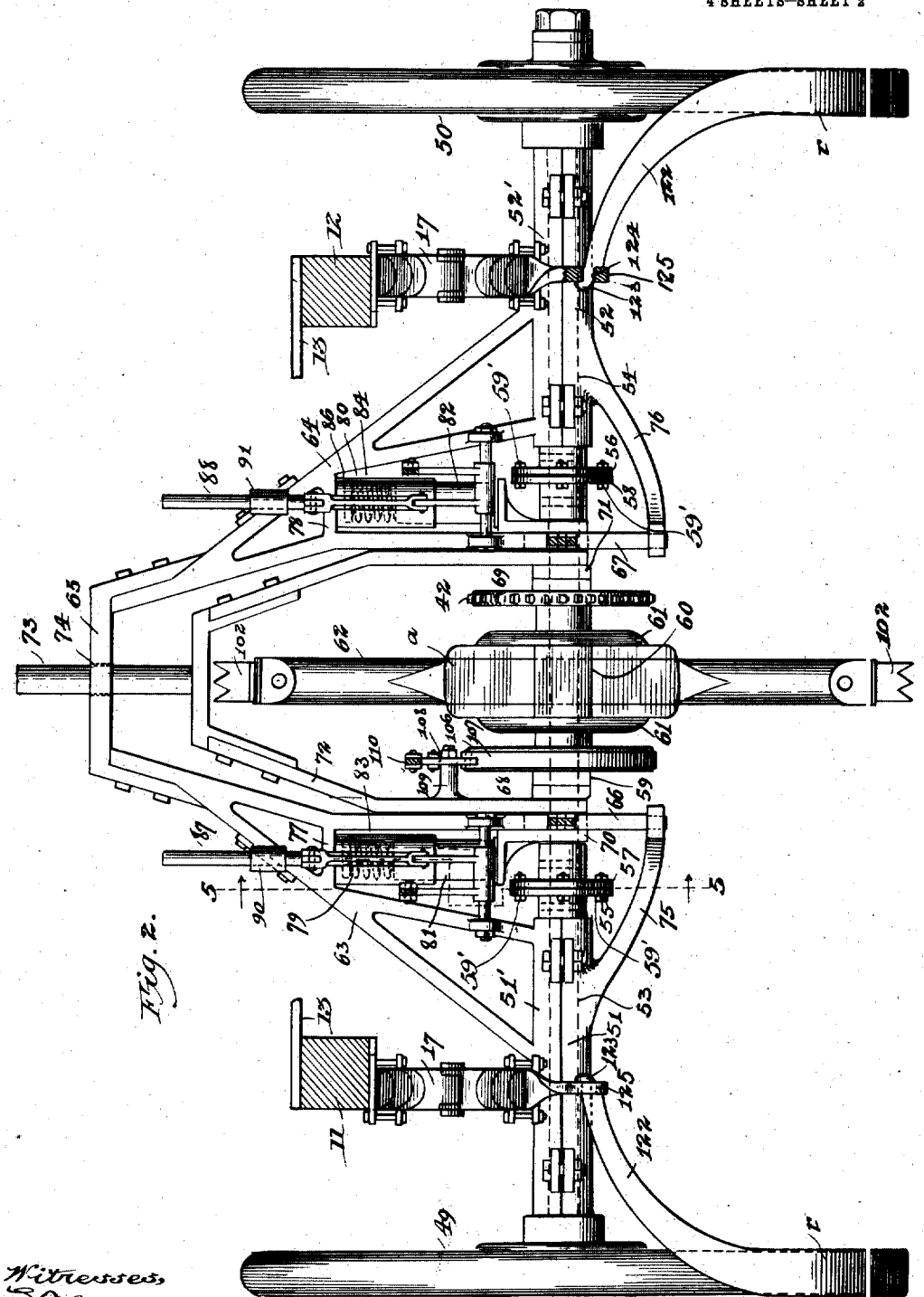

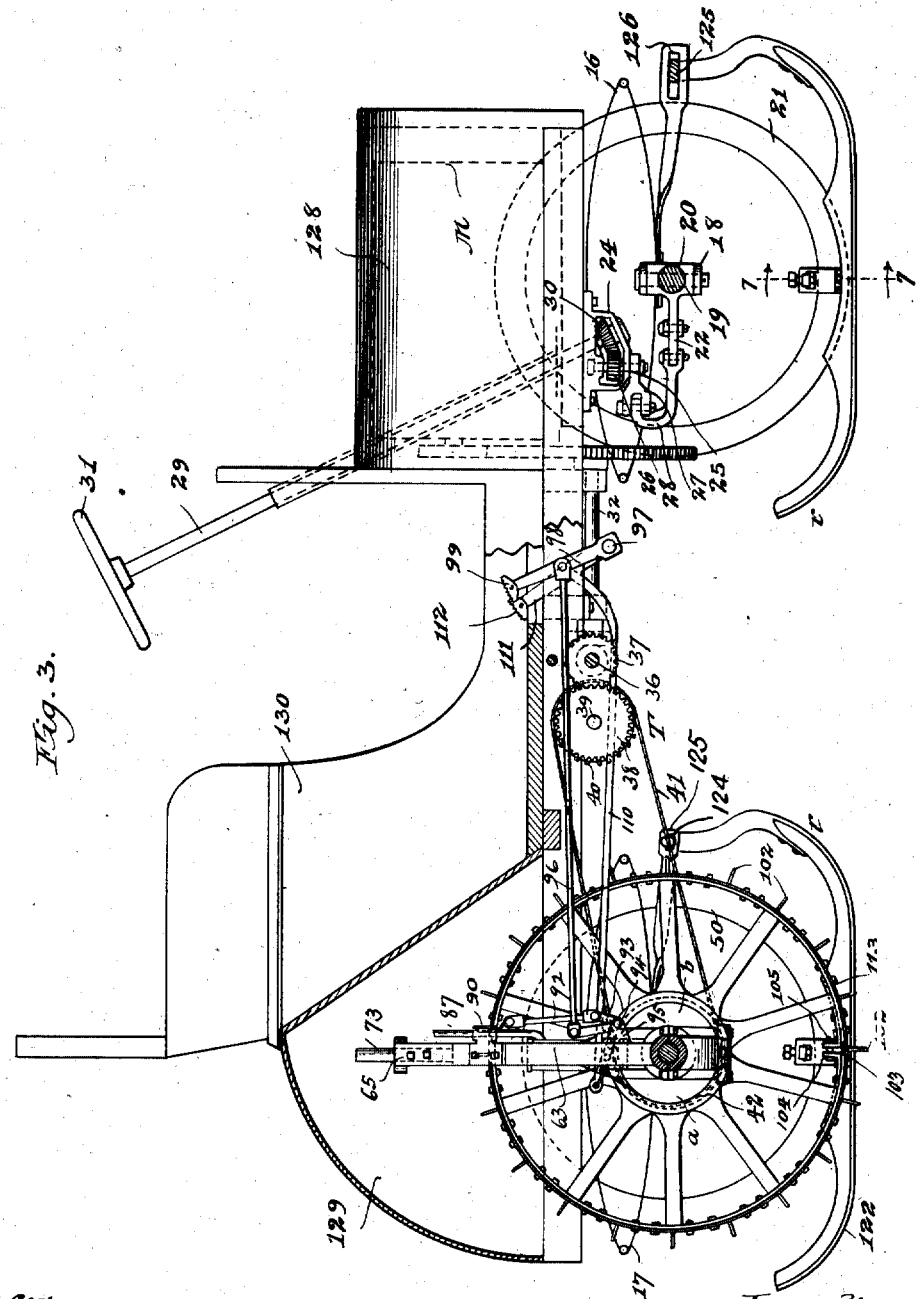

UNITED STATES PATENT OFFICE.

ALEXANDER FINKELSTEIN, OF CHICAGO, ILLINOIS.

AUTOMOBILE SLEIGH.

1,008,409. Specification of Letters Patent. Patented Nov. 14, 1911.

Application filed March 27, 1911. Serial No. 617,265.

*To all whom it may concern:*

Be it known that I, ALEXANDER FINKELSTEIN, a resident of Chicago, in the county of Cook and State of Illinois, have invented certain new and useful Improvements in Automobile Sleighs, of which the following is a specification.

My invention relates to automobile sleighs, and contemplates improved features of construction and operation.

Among the important objects are to provide improved mechanism and arrangement for enabling the vehicle to be transformed more readily from an ordinary wheel vehicle to a sleigh vehicle; to provide simplified drive mechanism which can be readily coupled to rotate the wheels of the vehicle and which can be as readily disassociated from the wheels and connected with a propulsion spur wheel; to provide improved means for adjusting the traction effect of the propulsion spur wheel; to provide improved means for detachably securing runners to the wheels; and in general to provide an improved construction in a device of the character referred to.

The various features of my invention are clearly illustrated in the accompanying drawings, in which—

Figure 1 is a plan view of the vehicle with the seat body removed, Fig. 2 is an enlarged sectional view taken substantially from plane 2—2, Fig. 1, and showing only one-half of the propulsion wheel; Fig. 3 is a view of the vehicle looking substantially from plane 3—3, Fig. 1, Fig. 4 is an enlarged side elevational view of adjacent sections of the spur propulsion wheel, Fig. 5 is an enlarged view of spring bearing adjusting mechanism, looking from plane 5—5, Fig. 2, Fig. 6 is a sectional view taken from plane 6—6, Fig. 5, and Fig. 7 is an enlarged sectional view from plane 7—7, Fig. 3, to show the mechanism for securing the runners to the wheels.

The supporting frame 10 for the vehicle may be of wood or metal and of any suitable construction, comprising, as shown, longitudinal side beams 11 and 12 connected together at intervals by cross beams 13. The body frame 10 is supported on front and rear axle structures 14 and 15, suitable springs 16 and 17 being interposed. The front axle structure 14 terminates in bifurcate heads 18 in which the hubs 19 are pivoted from which the wheel axles 20 extend to receive the front wheels 21. On the hubs 19 arms 22 extend rearwardly and are connected by a cross rod 23. To the lower side of the frame 10 a bracket 24 is secured, in which is journaled a vertical shaft 25 carrying a gear 26. To the lower end of this shaft the arm 27 is secured, to whose end is pivoted the link 28 whose other end pivots to one of the arms 22. Also journaled in the bracket 24 is the steering post 29 terminating at its lower end in the pinion 30 which meshes with the gear 26, the upper end of the steering post terminating in the steering wheel 31.

At the center of the vehicle frame transmission mechanism T is installed to be driven by a suitable motor M installed at the front part of the frame. As indicated best in Fig. 1, the engine shaft 32 terminates in a bevel pinion 33 adapted to be free to coöperate with either of the bevel gears 34 or 35 mounted on the sliding shaft 36. A pinion 37 on this sliding shaft meshes with the gear 38 on counter shaft 39, which counter shaft carries a sprocket wheel 40 connected by chain 41 with the drive sprocket 42 associated with the rear axle structure 15. The sliding shaft 36 is controlled by suitable lever mechanism. As shown, a link 43 is connected with the shaft at one end and at its front end connects with the lever 44 pivoted at its lower end at 45 to the bracket 46, a tooth 47 on the lever coöperating with the segment rack 48 to lock the transmission train in any adjustable position.

On the rear axle structure 15 the driving wheels 49 and 50 are attached, and the vehicle can be propelled in the ordinary manner on its wheels, rotation of the driving sprocket 42 causing the driving wheels to propel the vehicle. My invention, however, contemplates the adaptation of the vehicle to be run as a sleigh, and consequently, therefore, the rear axle is of modified construction. As illustrated best in Fig. 2 the rear springs 17 are secured to the upper halves 51' and 52' of the split bearing frames 51 and 52 which journal respectively shaft sections 53 and 54 whose outer ends carry respectively the wheels 49 and 50. Secured to the inner end of these shaft sections are the flange coupling heads 55 and 56 adapted to be secured to the companion coupling heads 57 and 58 secured to the outer ends of the intermediate shaft section 59. It is on this intermediate shaft section that the driving sprocket 42 is mounted, and if this intermediate shaft section is secured to the outer shaft sections 53 and 54 by means of the flange couplings and bolts 59' the drive wheels 49 and 50 will be driven. This intermediate shaft section, however, also carries a polygonal hub 60 having flanges 61, and this hub is adapted to receive two halves $a$ and $b$ of a spur propulsion wheel 62 (Figs. 2 and 4). When this propulsion wheel is in place and the heads of the flange couplings are disconnected by withdrawal of bolts 59' the intermediate shaft section will be disconnected from the drive wheels 49 and 50, and the engine will cause rotation of the intermediate shaft section only and of the spur propulsion wheel, the vehicle being then driven by the engagement of such wheel with the ground. The vehicle during such propulsion could of course still be supported and run on the wheels 21, 49 and 50, but such spur propulsion wheel is preferably used only for propelling the vehicle over snow and ice, and the wheels are therefore provided with runners $r$ of any suitable construction, which construction will be taken up in detail later.

As best shown in Fig. 2, the bearing frames 51' and 52' support standard structures 63 and 64 connected together on top by the bridge frame 65, this frame and standards forming an arch structure. As best shown in Fig. 5 the inner walls 66 and 67 of the standards 63 and 64 extend downwardly below the line of the rear axle shafts and are bifurcated to form guide slots 68 and 69. Vertically slidable in these guide slots are the journal boxes 70 and 71 in which the intermediate shaft section 59 is journaled. A U-frame 72 extends upwardly from the journal boxes and has a central upwardly extending guide rod or stem 73 which passes through opening 74 from the top wall 65 of the arch structure mounted on the bearing sections 51 and 52. In order to further strengthen the arch structure, extensions 75 and 76 from the bearing frames 51 and 52 respectively are secured at their inner ends to the lower ends of the inner walls 66 and 67 of this arch structure. The arch structure has also horizontal wall sections 77 and 78, from which cylinders 79 and 80 extend downwardly and receive plungers 81 and 82 connected respectively with the tops of journal boxes 70 and 71. Within the cylinders are compression springs 83 and 84 respectively, as best indicated in Fig. 5, the upper ends of the springs abutting respectively against piston heads 85 and 86 within the cylinders and connected with vertical slide rods 87 and 88 respectively extending into the cylinders each through a suitable slot 89. Slide bearings 90 and 91 mounted on the arch structure receive the slide rods 87 and 88. Pivoted to each slide rod is a link 92 pivoted at its lower end to one arm of a bell crank lever 93 secured to a shaft 94 pivoted in lugs 95 extending from the arch structure, the other arm of the bell crank lever being connected with a rod 96 extending forwardly of the vehicle. As best shown in Fig. 1, the transverse shaft 97 is journaled to the machine body on the vehicle frame 10 and has the arms 98 at its ends connected with the respective rods 96. One of the arms 98 terminates in a foot plate 99, as best indicated in Fig. 3.

With the above arrangement, as soon as the coupling flanges are disconnected and the intermediate shaft section 59 freed from the outer shaft sections of the rear axle structure the traction power or pressure against the propulsion wheel 62 will be taken up by the springs 83 and 84, and the intermediate shaft journal boxes reciprocate vertically in accordance with the profile of the surface over which the propulsion wheel is traveling. The traction engagement of the propulsion wheel with the traction surface can be increased by actuation of the lever mechanism connected with the springs, and by engaging the foot plate 99 and swinging the arms 98 the connecting rods and bell crank mechanisms will be shifted to move the vertical rods 87 and 88 downwardly to cause compression of the springs 83 and 84 and thereby greater pressure of the propulsion wheel with the traction surface. The adjustment can be such that normally there need be no traction engagement of the propulsion wheel with the road and that such traction engagement will not take place until the foot lever controlled mechanism is actuated.

The propulsion wheel can of course be of any construction. As best illustrated in Fig. 4, it is preferably of two parts, as before described, the hub section having the polygonal hole $h$ for receiving the polygonal hub 60. The rim 100 has plates 101 secured thereto at intervals, each supporting a prong or spur member 102. The adjacent ends of the rim halves are fitted together at 103, and brackets 104 secured to the rim at the ends are bolted together by bolts 105 to thus secure the wheel halves together. Upon rotation of the wheel the prongs or spurs will engage in the ground and the vehicle be propelled. Where the vehicle is to be used in its ordinary way on its wheels the coupling flanges are secured together to connect together the intermediate shaft sections and the outer shaft sections, and the propulsion spur wheel can remain in place on the intermediate shaft section or can be removed.

In order to brake the vehicle, the brake wheel 106 is carried by the intermediate shaft section and engaged by a brake strap 107. A lever 108 is pivoted to the stud 109 on the U-frame 72, and one end of this lever connects with one end of the brake strap and the other end of the brake strap is pivoted to the other end of the lever, the lever being connected through rod 110 with an arm 111 pivoted to transverse shaft 97, already referred to, and carrying at its upper end a foot plate 112. Forward swing of the arm 111 will result in tightening of the brake strap about the brake wheel and in braking of the vehicle.

The runners $r$ for the wheels may be of any suitable construction. As shown, they comprise a body part 113 having the longitudinal pocket 114 for receiving the tire 115 of the wheel. Secured at its bend in said pocket is a U-frame 116 whose ends extend upwardly alongside the wheel rim, as best shown in Fig. 7, and have the openings or slots 117, 118, respectively. The ends of a strap 119 engage in these openings, and a set screw 120 passing through the strap engages against the inner side of the wheel rim to draw the runner body 113 securely against the wheel tire. In order to facilitate the application of the U-frames one end thereof, as the end $e$, may be hinged at 121.

The runner body deflects upwardly at its ends, and the lower surface has preferably a metallic shoe 122 secured thereto, and the shoe on each runner is preferably extended from the front end thereof to be connected with the vehicle frame. As best shown in Fig. 2, the shoe 122 of each rear wheel runner extends upwardly and inwardly, and its end 123 is hooked and engages in a slot 124 in the end of a bar 125 extending forwardly from the rear axle structure. The shoes of the front wheel runners are also prolonged upwardly and have pivotal connection with a cross rod 125′ (Fig. 1), this cross rod being slidably supported in slots 126 at the front ends of arms 127 extending forwardly from the front axle structure 14. The runners are preferably of spring material, and therefore the rod 125′ will act as a fender or bumper for the vehicle.

Any suitable form of seat body may of course be provided for the vehicle. As shown in Fig. 3, this body comprises a hood part 128 for inclosing the engine, a rear hood part 129 for covering the rear axle arch structure, and the intermediate arm 130 forming the operator's seat.

The vehicle which I have described is of simple construction and readily adaptable for use in the ordinary capacity as a rolling vehicle or adaptable for use on snow and ice. The same driving engine serves to drive the vehicle to roll it on its wheels or to propel it as a sleigh, and the change from the ordinary road vehicle to a sleigh can very readily and quickly be made. The runners could of course be omitted on the vehicle, and the shaft sections kept connected together and the spur propulsion wheel normally kept away from the road. Both the vehicle propulsion wheels and the spur wheel will then at all times be driven. If there is no snow or ice on the road and the road is not slippery the vehicle wheels themselves will propel the vehicle. However, as soon as snow or ice or slippery conditions are encountered the foot lever can be operated to press the spur wheel against the road, and the vehicle will be propelled in this manner over the slippery places. Of course where snow and ice will always be found the runners car be applied and the shaft sections disconnected and only the spur wheel used.

It is of course evident that a number of propulsion wheels could be mounted on the intermediate shaft.

I do not of course desire to be limited to the details of construction and operation which I have shown, as changes are possible which would still come within the scope of my invention, and I therefore claim the following:

1. In a vehicle of the class described, the combination of a vehicle frame, a driving axle structure comprising an intermediate shaft section and end sections, drive wheels on the end sections, drive mechanism on the vehicle body having driving connection with said intermediate shaft section, means for detachably connecting said shaft sections together whereby when said shaft sections are connected together said drive wheels will be driven to propel the vehicle, and a spur propulsion wheel mounted on said intermediate section for propelling said vehicle when said intermediate shaft sections are disconnected from the end shaft sections.

2. In a vehicle of the class described, the combination of a supporting body, front and rear axle structures on which said body is mounted, said rear axle structure comprising outer sections and an intermediate section, coupling mechanism for detachably connecting said sections together, supporting members on said outer axle sections, a propulsion wheel mounted on the intermediate axle section, and drive mechanism on the vehicle having driving connection with the intermediate axle section, said propulsion member being driven to propel the vehicle when said intermediate axle section is disconnected from the end sections.

3. In a vehicle of the class described, the combination of a vehicle body, a front axle structure, supporting members on said front axle structure, a vertical bearing frame supported from the vehicle body, a journal frame vertically reciprocable in said bearing frame, compression spring mechanism mounted on said bearing frame and pressing downwardly against the journal frame, a shaft journaled in said journal frame, a propulsion wheel mounted on said shaft, driving mechanism on the vehicle body having driving connection with said shaft, axle sections adjacent said shaft, vehicle supporting members on said axle sections, and coupling mechanism for coupling said axle sections to said shaft whereby the driving connection with said shaft may be communicated to the axle sections.

4. In a vehicle of the class described, the combination of a vehicle body, a front axle structure, vehicle supporting members on said axle structure, bearing frames supported from the body at the rear end thereof, outer shaft sections journaled in said bearing frames, vehicle supporting wheels on each outer shaft section, a vertical arch frame mounted on said bearing frames, journal boxes vertically reciprocable in the opposite sides of said arch frame, an intermediate shaft section journaled in said journal boxes, coupling mechanisms intervening between the intermediate shaft ends and the adjacent ends of the outer shaft sections whereby said shaft sections may be disconnected or connected together, a spur propulsion wheel mounted on said intermediate shaft section, driving mechanism on the vehicle body, and controllable driving connection between said driving mechanism and said intermediate shaft section.

5. In a vehicle of the class described, the combination of a vehicle body, a front axle structure, vehicle supporting members on said axle structure, bearing frames supported from the body at the rear end thereof, outer shaft sections journaled in said bearing frames, vehicle supporting wheels on each outer shaft section, a vertical arch frame mounted on said bearing frames, journal boxes vertically reciprocable in the opposite sides of said journal boxes, coupling mechanisms intervening between the intermediate shaft ends and the adjacent ends of the outer shaft sections whereby said shaft sections may be disconnected or connected together, a spur propulsion wheel mounted on said intermediate shaft section, driving mechanism on the vehicle body, controllable driving connection between said driving mechanism and said intermediate shaft section, and compression means mounted on said arch frame and acting downwardly against said journal boxes and propulsion wheel mounted on said intermediate shaft whereby said propulsion wheel will be pressed against the traction surface to cause disconnection of the intermediate shaft section from the end shaft sections.

6. In a vehicle of the class described, the combination of a vehicle body, a steering structure for supporting the front end of said body, bearing frames supported from the rear end of said body, a shaft section journaled in each bearing frame, a vehicle wheel on each shaft section, a supporting frame mounted on said bearing frames, an intermediate shaft section journaled on said supporting frame, coupling members adapting said intermediate shaft section for detachable connection with said wheel supporting shaft sections, a spur wheel propulsion member mounted on said intermediate shaft section, driving mechanism on the vehicle body having driving connection with said intermediate shaft section, said detachable coupling mechanisms allowing said spur propulsion wheel to be driven alone to propel the vehicle or said wheel and vehicle wheels to be driven together to propel the vehicle.

7. In a vehicle of the class described, the combination of the vehicle body, a front steering shaft section carrying supporting wheels, a rear axle section comprising an intermediate shaft section and two outer shaft sections, a propulsion wheel on each outer shaft section, a spur propulsion wheel mounted on said intermediate shaft section, drive mechanism on said vehicle body having driving connection with said intermediate shaft section, coupling mechanism for detachably connecting said intermediate shaft section with said end shaft sections, said end shaft sections being driven when said intermediate shaft section is coupled thereto to cause the vehicle drive wheels to propel the vehicle, and said spur propulsion wheel alone propelling the vehicle when said intermediate shaft section is uncoupled from the end shaft sections, and sleigh runners applied to the vehicle wheels when said spur propulsion wheel is driven to propel the vehicle.

8. In a vehicle of the class described, the combination of a supporting body, a front axle structure and supporting members thereon, a bearing frame, axle bearings at the outer ends of said frame, an axle section journaled in each of said bearing frames, a supporting member secured to the outer end of each axle section and a coupling head secured to the inner end of each axle section, an intermediate axle section vertically reciprocable in said bearing frame, a coupling head at either end of said intermediate axle section adapted for engagement with the coupling heads of the inner ends of the outer axle sections, a propulsion wheel mounted on said intermediate axle section, and driving mechanism on said vehicle supporting body having driving connection with said intermediate axle section.

9. In a vehicle of the class described, the combination of a supporting body, a front axle structure and supporting members thereon, a vertical bearing frame supported from the rear end of said supporting body, the outer ends of said vertical bearing frame terminating in left and right journal boxes, an axle section in each journal box, a supporting member secured to the outer end of each axle section and a coupling head secured to the inner end of each axle section, an intermediate axle section between said outer axle sections, journal boxes vertically reciprocable in said bearing frame for journaling said intermediate axle section, a coupling head in each end of said intermediate axle section adapted to be rigidly secured to the coupling heads of the inner ends of the outer axle sections whereby the three axle sections are rigidly connected together, said coupling heads being adapted for disengagement whereby said intermediate axle section is disconnected from the outer axle sections and may be vertically reciprocated with its journal boxes, a propulsion wheel mounted on said intermediate axle section, and driving mechanism on said supporting body having driving connection with said intermediate axle section.

10. In a vehicle of the class described, the combination of a supporting body, a vertical bearing frame supported from said body, journal boxes at the lower outer ends of said vertical bearing frame, an outer axle section journaled in each of said journal boxes, a supporting member secured to the outer end of each axle section, an intermediate axle section between said outer axle sections, journal boxes vertically reciprocable in said bearing frame for journaling said intermediate axle section, a propulsion wheel mounted on said intermediate axle section, driving mechanism on the supporting body having connection with said intermediate axle section, a cylinder mounted on said bearing frame over each of the journal boxes for said intermediate axle section, a plunger extending from each journal box into the lower end of the corresponding cylinder, a second plunger in each cylinder, a compression spring in each cylinder interposed between the plungers therein, and lever mechanism connecting with said second plungers and operable from the vehicle body for causing downward pressure against said springs to thereby increase the compression effect of said springs on said journal boxes and to thereby increase the traction engagement of said propulsion wheel with the surface over which the vehicle travels.

In witness whereof, I hereunto subscribe my name this 22nd day of March, A. D. 1911.

ALEXANDER FINKELSTEIN.

Witnesses:
CHARLES J. SCHMIDT,
NELLIE B. DEARBORN.

Copies of this patent may be obtained for five cents each, by addressing the "Commissioner of Patents, Washington, D. C."